US006026550A

United States Patent [19]

Silano

[11] Patent Number: 6,026,550

[45] Date of Patent: Feb. 22, 2000

[54] TOOL FOR SERVICING SUBTERRANEAN GATE VALVES

[76] Inventor: Peter Silano, 18 Pond View Ave., Trumbull, Conn. 06611

[21] Appl. No.: 09/095,995

[22] Filed: Jun. 11, 1998

Related U.S. Application Data

[60] Provisional application No. 60/050,020, Jun. 16, 1997.

[51] Int. Cl.[7] .......... B23P 19/04

[52] U.S. Cl. .......... 29/239; 29/266; 29/252

[58] Field of Search .......... 29/263, 266, 239, 29/237, 283, 280, 252, 254, 255, 275, 270, 264, 213.1; 254/18, 19, 93 R, 100

[56] References Cited

U.S. PATENT DOCUMENTS 1,535,012 4/1925 Zeller .......... 29/263

3,081,066 3/1963 Murawski .......... 254/93 R

*Primary Examiner*—Robert C. Watson

*Attorney, Agent, or Firm*—John R. Doherty

[57] ABSTRACT

The invention is directed to a tool for removing and replacing the operating nut on a subterranean gate at the bottom of a valve tile. The tool comprises an elongated threaded rod moveably mounted inside of an elongated outer tube and having a threaded nut secured to its upper end. A bifurcated member is affixed to the lower end of the rod. The bifurcated member is configured to fit easily underneath the operating nut for lifting the nut off of the valve stem. A nut retaining member is mounted to the lower end of the tube for holding a new operating nut on top of the bifurcated member during the replacement operation.

4 Claims, 1 Drawing Sheet

TOOL FOR SERVICING SUBTERRANEAN GATE VALVES

This application claims the benefit of U.S. Provisional application No. 60/050,020, filed Jun. 16, 1994.

BACKGROUND

1. Field of the Invention

This invention relates to a tool for servicing subterranean gate valves employed in underground utility systems.

2. Description of the Prior Art

The problem with subterranean gate valves of the type to which the present invention relates is that the operating nut, which is disposed on top of the valve casing, corrodes readily over time and loose its shape, that is, the nut becomes more round or less square, so that the nut is no longer useful for turning the square valve stem for operating the valve. In such instances, it may become necessary to excavate the earth around the valve tile to expose the valve and replace the valve operating nut. This can be a time-consuming and costly procedure.

In my U.S. Pat. No. 5,638,590, entitled "Tool for Servicing Subterranean Gates Valves", issued on Jun. 17, 1997, I disclose and claim a tool for removing and replacing the operating nut on a subterranean gate valve without having to excavate or otherwise disturb the environment surrounding the valve. The tool comprises an elongated shaft having a handle at its upper end and a bifurcated member affixed to its lower end. The bifurcated member is configured to fit easily underneath the operating nut for lifting the nut off of the valve stem. A tubular slide is mounted on the shaft and is adapted to impact against a slide stop located below the handle. An operating nut retaining member is adjustably mounted to the lower end of the shaft for holding a new operating nut on top of the bifurcated member during the replacement operation.

SUMMARY OF THE INVENTION

The present invention is directed to a tool for servicing subterranean gate valves which is an improvement of that disclosed and claimed in my above referred U.S. patent, the disclosure of which is incorporated herein by reference. The tool differs from the original design in that the tubular impact hammer is removed and replaced by an elongated threaded rod moveably mounted inside an elongated outer tube. The tube has a threaded nut at its outer end and a wrench or ratchet mounted to the nut for rotating the threaded rod and effecting movement thereof through the tube under a pressure sufficient to remove the operating nut from the gate valve.

DESCRIPTION OF THE PREFERRED EMBODIMENTS

Figure 1:
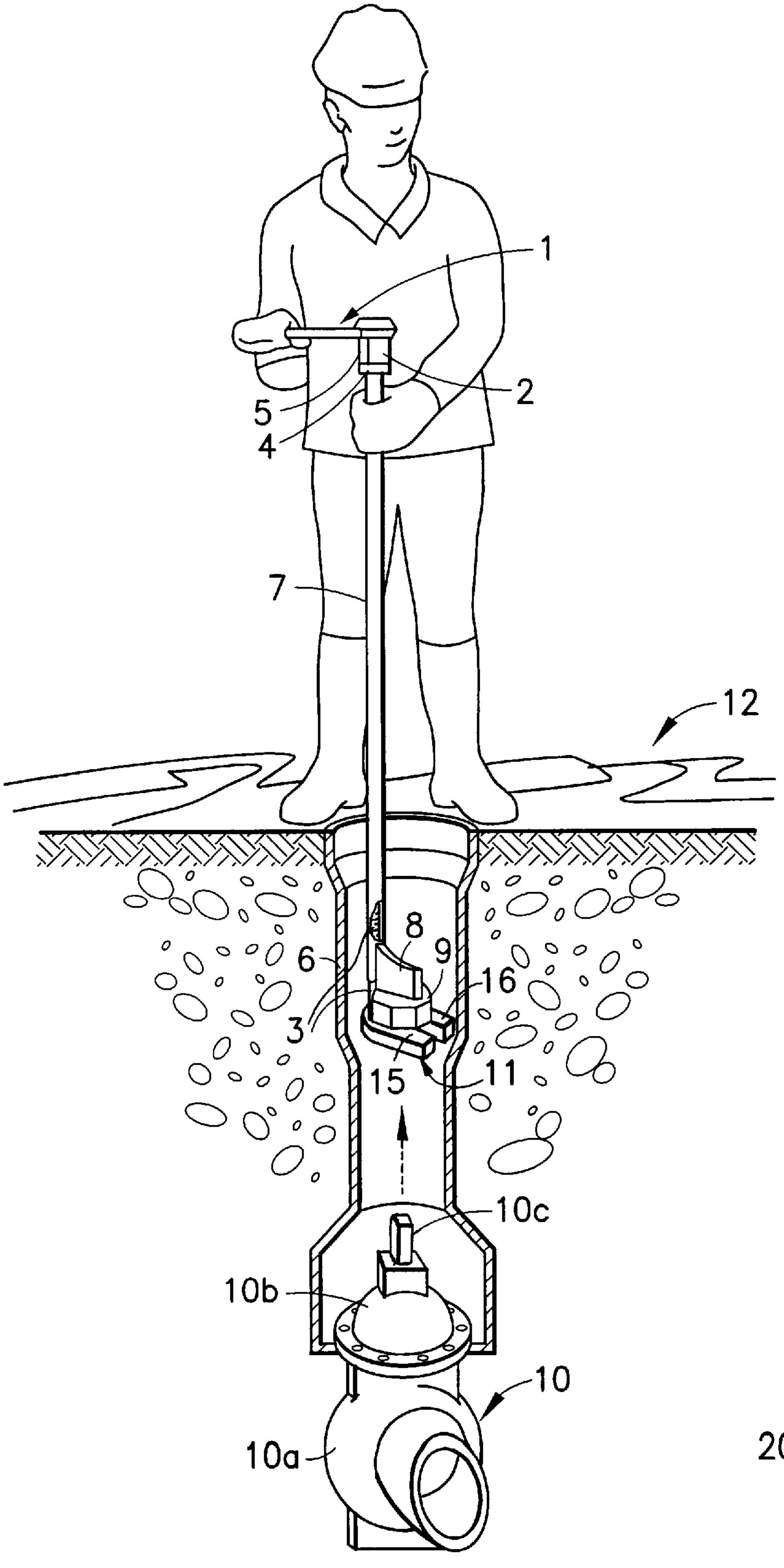
FIG. 1 is a side elevational view of the tool as it appears in its operative position withdrawing the operating nut from a subterranean gate valve.

Referring now to the drawing in detail, the reference numeral 10 denotes a subterranean gate valve including a valve body 10*a* and a valve bonnet 10*b* having a valve stem 10*c* extending upwardly from the top end thereof. An operating nut 9, usually made of cast iron, for example, is removably mounted on top of the valve stem 10*c* for opening and closing the gate valve using a conventional socket or wrench. The gate valve 10 is typically connected to a utility pipeline (not shown) buried anywhere from about three to twelve feet below the pavement 12 of a roadway or the like. An elongated, tubular valve tile or box 6 extends downwardly from the pavement 12 to the gate valve 10 providing access to the operating nut 9 for controlling and servicing the valve. A lid or cover (not shown) is usually placed over the upper end of the valve box 6 to help keep dirt and debris from entering the tile.

The tool for removing and replacing the valve operating nut 9 according to the invention comprises an elongated threaded steel rod 3 moveably mounted inside an outer steel pipe 7. The pipe 7 as a threaded fastener or nut 2 positioned at its outer end and secured to the upper end of the threaded rod 3. The rod and pipe should be sufficiently long to extend fully the entire length of the valve box 6 from approximately the waist height of the operator as shown in FIG. 1.

At the lower end of the rod 3, there is provided according to the invention a bifurcated nut retainer 11 for removing and replacing the valve operating nut 9. Preferably, the bifurcated retainer 11 is secured to the bottom of the rod 3 by a strong, permanent weld.

As shown in FIG. 1 and described in detail in my above referred U.S. patent, the bifurcated member 11 consists of two elongated prongs 15 and 16 which are configured and adapted to fit underneath the operating nut 9 on the valve stem 10*c*. The prongs are spaced apart a sufficient distance to fit around the valve stem 9 and preferably have their inner edges inclined inwardly in a direction toward the rod 3. This assures that the prongs will easily clear the valve stem and grasp the underneath side of the operating nut 9.

It is important that the two prongs 15 and 16 extend outwardly from the rod 3 in a substantially perpendicular direction as shown in FIG. 1. This configuration makes it easier for the operator to guide the bifurcated member 11 underneath the operating nut 9 using the rod as leverage. It is also important, for reasons to be made clear hereinafter, to position the bifurcated member 11 on the rod 3 with its top flat surface lying in a plane that is substantially perpendicular or normal to the axis of the rod.

Spaced from the top surface of the bifurcated member 11 and attached to the lower end of the tube 7 is a retainer member in the form, for example, of a vertical plate 8 for holding the operating nut 9 on top of the flat bifurcated member 11 during the withdrawal and replacement procedure as shall be explained. The retainer plate 8 is suitably welded to the end of the pipe 7 and is sufficiently long to cover at least a third of the width of the operating nut 9.

To use the tool according to the invention, the operator lowers the tool through the open valve box 6 to its bottom end while standing over the box opening as depicted in FIG. 1. The operator then maneuvers the tool to place the bifurcated member 11 underneath the valve operating nut 9 in the manner as described hereinabove. With the two prongs 15 and 16 contacting the underside of the operating nut 9, the operator rotates the rod 3 in a counter-clockwise direction, for example, with a ratchet 1 moving the rod and the bifurcated member upwardly until the plate 8 makes contact with the valve stem, applying sufficient axial force against the operating nut 9 to loosen it from around the valve stem 10*c*. The operating nut 9 is then withdrawn from the gate valve while resting on top of the flat bifurcated member in the manner as depicted in FIG. 1. It is of course important that the operating nut 9 be kept level on top of the flat bifurcated member so that it does not fall off during the removal operation.

Once the valve operating nut 9 has been fully withdrawn, the old operating nut is discarded and a new valve nut is placed on top of the bifurcated member 11. The new valve nut is held in place by the vertical plate 8 and is then lowered again through the valve box 6 and the new nut is carefully placed over the top of the valve stem 10*c*. The tool 10 is then raised again out of the valve box, leaving the new operating nut in place on the valve stem 10*c* for controlling the valve.

The tool of the invention is simple to construct, easy to use and economical to manufacture. While it may typically require thousands of dollars in man hours of work and equipment to excavate a subterranean gate valve and replace its operating nut, the same procedure can be accomplished for a mere fraction of the cost using the instant valve servicing tool.

Figure 2:
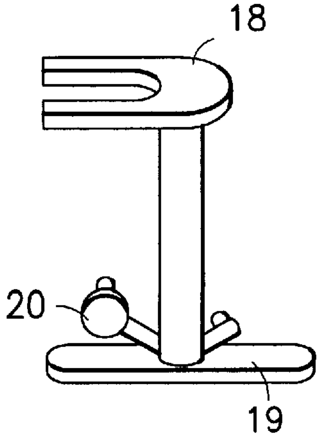
FIG. 2 is a perspective view of a modified hydraulic jack which can be employed with the tool illustrated in FIG. 1 for more accurately adjusting the pressure applied to the tool during its operation.

FIG. 2 shows a modification of the tool according to the invention which employs an hydraulic jack as shown in FIG. 2. The jack is provided with a bifurcated top plate 18, a base plate 19 and a pressure gage 20. In those situations where substantially high pressures are needed to loosen the operating nut 9, the modified jack may be placed on top of the pavement 12 and between the pavement and the upper end of the tool with the bifurcated top plate 18 underneath the nut 2. The jack can be made to a standard high to accommodate the tool so that the rod and pipe will extend the full distance between the operator and the gate valve 10 or means can be provided for varying the height of the jack to accommodate valves positioned other than the usual distance below the pavement.

Once the tool has been set up to remove an operating nut in the manner as described above and it is determined that the pressure required to remove the nut may exceed a certain limit where further pressure may result in breakage of the valve or valve stem, then the hydraulic jack may be placed underneath the threaded nut 2 of the tool as described and the actual pressure applied against the valve nut 9 may be measured so as to not exceed the unsafe limit and destroy the valve. In such cases where the limit may be exceeded, the operating nut will have to be removed in the standard way by excavating the ground around the valve box to remove the same and to expose the valve stem for removal of the nut.

Other features and modifications of the tool of the invention are possible without departing from the spirit and scope of the invention. For example, it is possible to employ other types of retainer members for holding the operating nut on the bifurcated plate such as a removable clamp fitted around the rod 3.

What is claimed is:

1. A tool for removing and replacing the operating nut on the valve stem of a subterranean gate valve located at the bottom of a valve tile, said tool comprising, in combination:

an elongated hollow tube having an upper and a lower end;

an elongated threaded rod having an upper and a lower end, said rod being mounted inside of said tube;

a retainer member positioned over said tube and secured to said upper end of said rod;

means for rotating said rod such that said rod is caused to move axially in either direction through said tube;

a bifurcated member attached to said lower end of said rod and adapted to fit underneath said operating nut; and means affixed to said lower end of said tube for contacting said operating nut and retaining said nut on said bifurcated member.

2. A tool for removing and replacing the operating nut on the valve stem of a subterranean gate valve located at the bottom of a valve tile, said tool comprising, in combination:

an elongated hollow tube having an upper and a lower end;

an elongated threaded rod having an upper and a lower end, said rod being mounted inside of said tube;

a retainer member positioned over said tube and secured to said upper end of said rod;

means for rotating said rod such that said rod is caused to move axially in either direction through said tube;

a bifurcated member attached to said lower end of said rod and adapted to fit underneath said operating nut;

means affixed to said lower end of said tube for contacting said operating nut and retaining said nut on said bifurcated member; and an hydraulic jack for exerting axial pressure on said rod, said hydraulic jack being equipped with a pressure gage for measuring said axial pressure.

3. A tool for removing and replacing the operating nut on the valve stem of a subterranean gate valve located at the bottom of a valve tile extending below a surface, said tool comprising, in combination:

an elongated hollow tube having an upper and a lower end;

an elongated threaded rod having an upper and a lower end, said rod being mounted inside of said tube;

a threaded fastener positioned over said tube and threadably secured to said upper end of said rod;

a bifurcated member attached to said lower end of said rod and adapted to fit underneath said operating nut;

a nut retainer affixed to said lower end of said tube for contacting said operating nut and retaining said nut on said bifurcated member; and means for rotating said rod such that said rod is caused to move axially in one direction through said tube for grasping said operating nut between said bifurcated member and said nut retainer and in an opposite direction for releasing said operating nut during replacement thereof.

4. A tool according to claim 3, further including an hydraulic jack disposed between said surface and said threaded fastener for exerting axial pressure on said rod, said hydraulic jack being equipped with a pressure gage for measuring said axial pressure.

* * * * *